United States Patent [19]

Prange

[11] Patent Number: 5,009,242

[45] Date of Patent: Apr. 23, 1991

[54] APPARATUS FOR MONITORING SEWER CLEANING TOOL EXTENSION

[75] Inventor: Charles J. Prange, Cridersville, Ohio

[73] Assignee: Sewer Rodding Equipment Company, Lima, Ohio

[21] Appl. No.: 405,988

[22] Filed: Sep. 12, 1989

[51] Int. Cl.$^5$ ................................................ B08B 9/04
[52] U.S. Cl. .................................. 134/113; 15/104.33; 33/739; 134/167 C; 137/355.12; 254/134.3 FT
[58] Field of Search ............... 134/113, 167 C, 168 C; 15/104.33; 254/134.3 FT, 270; 33/739, 750; 137/355.12, 553

[56] References Cited

U.S. PATENT DOCUMENTS

| | | | |
|---|---|---|---|
| 3,394,422 | 7/1968 | Siegal | 15/104.33 |
| 4,334,217 | 6/1982 | Nield et al. | 33/750 X |
| 4,540,017 | 9/1985 | Prange | 137/355.12 |

Primary Examiner—Philip R. Coe
Attorney, Agent, or Firm—Killworth, Gottman, Hagan & Schaeff

[57] ABSTRACT

A mobile sewer cleaning machine comprises an elongated sewer cleaning tool wound upon a reel mounted in a reel compartment of the machine. A reel control motor is coupled to the reel to rotate the reel in one direction to play out the tool into a sewer by unwinding it, and in the opposite direction to retract the tool from the sewer by rewinding it. A rotatably mounted tool sensing drum is frictionally engaged with and rotated by the tool and includes a position indicator adjustably mounted to its side. Two proximity sensors are positioned to sense the position indicator as the drum is rotated by extension or retraction of the tool. To provide improved accuracy and ease of operation, the two proximity sensors are mounted opposite to one another across a diameter of the tool sensing drum. First and second switches are coupled to the reel control motor for activating one of the proximity sensors upon rotation of the motor in one direction and the other of the proximity sensors upon rotation of the motor means in the opposite direction. An electronic counter is connected to the sensors by the first and second switches for counting signals generated by the sensors and displaying a count representative of the extent of the tool which extends from the reel. The electronic counter includes input switches for entering a desired count and output contacts for indicating when an entered count has been reached. An audible and/or visual alarm is activated by the output contacts of the electronic counter upon reaching the desired count.

6 Claims, 3 Drawing Sheets

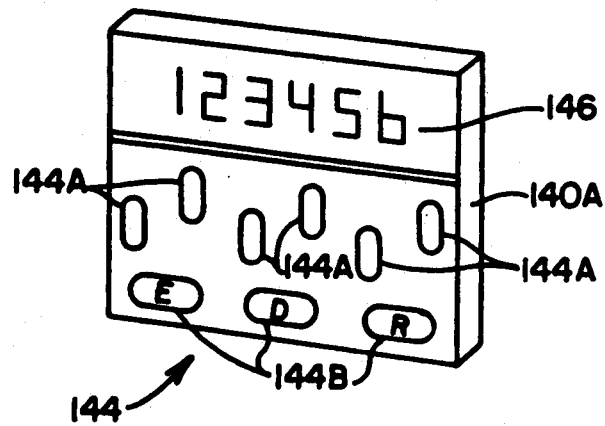
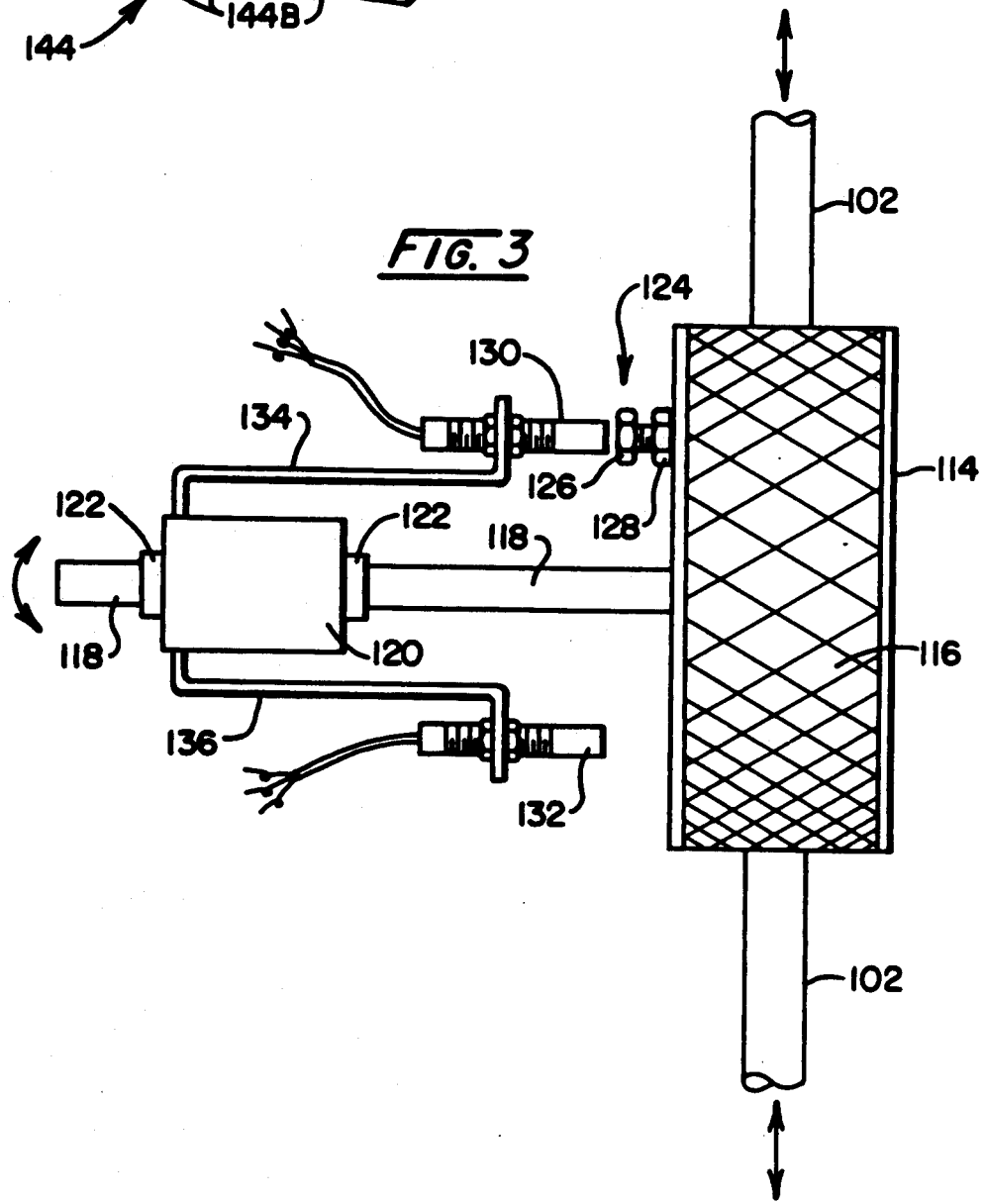

APPARATUS FOR MONITORING SEWER CLEANING TOOL EXTENSION

BACKGROUND OF THE INVENTION

The present invention relates generally to mobile sewer cleaning machines and, more particularly, to a method and apparatus for monitoring the length an elongated sewer cleaning tool is extended from such a machine.

A mobile sewer cleaning machine typically includes an elongated sewer cleaning tool wound on a reel that is mounted in a compartment of a truck body or trailer. A control panel for controlling the machine and the drive for the reel is typically mounted on the machine adjacent the reel. The tool may comprise a high pressure hose, a series of rods interconnected to define a required tool length, a spiral wound "snake", or other appropriate tool which includes an appropriate cleaning attachment secured to its end.

In such machines, a length of tool is unwound and paid out from the reel under the control of an operator standing at the control panel alongside the hose. For rods, snakes and the like, the cleaning attachment is forced through the sewer. For the high pressure hose, the cleaning attachment typically comprises a jet nozzle which pulls itself and the hose through the sewer by the force generated by a rearwardly directed high pressure water stream emanating from the nozzle while at the same time washing the debris in the sewer back toward the manhole entrance to the sewer. Whatever the tool, after the sewer has been cleaned or if a reverse cleaning pass is to be made, the reel drive is reversed to thereby retract the tool from the sewer and wind it back onto the reel.

Normally the length of sewer cleaning tool provided is somewhat longer than that necessary to clean the longest sections of sewer which extend between adjacent manhole entrances to the sewer. Thus, an operator will open a manhole, clean the section of sewer which extends from the opened manhole to the next adjacent manhole, retract the tool from the sewer and move the machine to the next adjacent manhole to continue the cleaning operations for the entire run of sewer to be cleaned. For such operation, the operator must keep track of the length of tool which has been extended from the machine and, knowing the distance to the next adjacent manhole, stop the machine after the section of sewer interconnecting the manholes has been cleaned.

To this end, mechanical counters have been coupled to the cleaning tool as shown for example is U.S. Pat. No. 4,540,017. While such mechanical counters provide an accurate indication of the length of cleaning tool extended from the machine to permit an operator to properly clean sewer sections between adjacent manholes, they require substantial attention on the part of the operator who must frequently monitor the mechanical counter to know when the section of sewer has been cleaned. Such monitoring is difficult under the least distracting conditions on manual cleaning machines which require substantially more operator attention and on automatic machines becomes almost impossible for all but the most attentive operators.

Accordingly, there is a need for a method and apparatus for monitoring sewer cleaning tool extension from a sewer cleaning machine which is not demanding on an operator of the machine and, preferably, warns the operator a short time before operator action is required such that it relieves the operator of tedious duties and is not dependent for its effectiveness upon frequent attentive monitoring by the operator. Such a tool extension monitoring method and apparatus would help ensure the most efficient operation of a sewer cleaning machine and also help prevent potential operating problems which might otherwise occur if the machine is permitted to operate beyond its proper operating limits.

SUMMARY OF THE INVENTION

The present invention provides a method and apparatus designed to satisfy the aforementioned need by electronically monitoring the length extension of an elongated sewer cleaning tool from a sewer cleaning machine. In the present invention, in addition to electronically monitoring and digitally displaying the extended tool length, a machine operator can preset a tool extension length into the apparatus which will then signal the operator when the preset tool length has been reached by either extension or retraction of the tool. Thus, the operator is forewarned when action is required and can attentively monitor an electronic display of the apparatus until the desired ultimate length, which is greater than the preset length for extension and less than the preset length for retraction, is attained. A tool monitoring drum is frictionally engaged with the tool and rotates one revolution corresponding to the circumference of the drum for extension or retraction of a predefined length of the tool. To provide improved accuracy and ease of operation, two sensors are provided diametrically opposed relative to the drum to monitor a position indicator on the drum with one sensor being activated for tool extension or length upcounting and the other sensor being activated for tool retraction or length downcounting. Thus, revolutions of the drum are sensed, counted up for tool extension and counted down for tool retraction.

In accordance with one aspect of the present invention, a mobile sewer cleaning machine comprises an elongated sewer cleaning tool wound upon a reel mounted in a reel compartment of the machine. Motor means are coupled to the reel for rotation. Motor control means operate the motor means in one direction to play out the tool into a sewer by unwinding it from the reel, and in the opposite direction to retract the tool from the sewer by rewinding it onto the reel. Movement signaling means is coupled to the tool for generating signals representative of play out of the tool in defined incremental lengths and electronic counter means is connected to the movement signaling means and responsive to the signals for displaying a count representative of the extent of the elongated sewer cleaning tool which has been unwound from the reel. The electronic counter means includes input means for selecting a desired count and output means for indicating when a desired count has been reached. Alarm means connected to the output means of the electronic counter means generates an alarm signal upon reaching the desired count.

Preferably, the movement signaling means further provides for generating signals representative of retraction of the tool in defined incremental lengths and the electronic counter means is responsive to the signals for displaying a count representative of the extent of the elongated sewer cleaning tool which has been unwound from and/or rewound onto the reel. According to one working embodiment of the present invention, the movement signaling means comprises a rotatably mounted tool sensing drum which is frictionally engaged with and rotated by the tool, the tool sensing drum including a position indicator mounted thereto.

At least one sensor means is positioned to sense the position indicator as the drum is rotated by extension or retraction of the tool. In the noted working embodiment, the sensor means comprises two proximity sensors and the movement signaling means further comprises switch means coupled to the motor control means for activating one of the proximity sensors upon rotation of the motor means in one direction and the other of the proximity sensors upon rotation of the motor means in the opposite direction. To provide improved accuracy and ease of operation, the two proximity sensors are mounted opposite to one another across a diameter of the tool sensing drum.

The motor means may comprise a hydraulic motor having forward, reverse and return hydraulic fluid lines. The switch means may then comprise a first pressure switch coupled to the forward hydraulic fluid line and a second pressure switch coupled to the reverse hydraulic fluid line. The alarm means may be an audible alarm, a visual alarm, or both audible and visual alarms.

In accordance with another aspect of the present invention, a method for operating a mobile sewer cleaning machine wherein an elongated sewer cleaning tool is wound upon a reel mounted in a reel compartment of the machine, the tool being unwound by operation of a reel control motor in one direction to play out the tool into a sewer, and being rewound by operation of the reel control motor in the direction opposite to the one direction to retract the tool from the sewer comprises the steps of: sensing extension of the tool from the machine; generating signals representative of length increments of the extension of the tool from the machine; accumulating the signals to determine the length of the elongated sewer cleaning tool extended from the reel; entering a desired length extension; and, activating an alarm when the length of the elongated sewer cleaning tool extended from the reel is equal to the entered length extension, whereby an operator of the mobile sewer cleaning machine is alerted to action upon attaining the entered length extension.

The method may further comprise the steps of: sensing retraction of the tool into the machine; generating signals representative of length increments of the retraction of the tool from the machine; and, algebraically accumulating the signals representative of tool extension and tool retraction to determine the length of the elongated sewer cleaning tool extended from the reel whereby the operator is alerted to action upon either the extension or the retraction of the tool. Preferably, the step of generating signals representative of the extension and retraction of the tool comprises the steps of: sensing the extension of the tool by means of a first sensor; sensing the retraction of the tool by means of a second sensor; and, monitoring the operation of the reel control motor to enable the first or second sensor in response to the direction of operation of the reel control motor.

It is an object of the present invention to provide a method and apparatus for automatically monitoring sewer cleaning tool extension in a sewer cleaning machine which does not require the continuous attention of an operator for efficient operation of the machine; to provide a method and apparatus for automatically monitoring sewer cleaning tool extension in a sewer cleaning machine which will signal an operator when a preset tool length has been reached by either extension or retraction of the tool; to provide a method and apparatus for automatically monitoring sewer cleaning tool extension in a sewer cleaning machine by means of a drum which frictionally engages and is rotated by the tool and a pair of proximity sensors which are positioned such that a position indicator mounted on the drum passes by and is sensed by the sensors as the drum is rotated; and, to provide a method and apparatus for automatically monitoring sewer cleaning tool extension in a sewer cleaning machine by means of a drum which frictionally engages and is rotated by the tool and a pair of proximity sensors which are positioned diametrically opposite relative to the drum to monitor a position indicator mounted on the drum as the drum is rotated.

Other objects and advantages of the invention will be apparent from the following description, the accompanying drawings and the appended claims.

BRIEF DESCRIPTION OF THE DRAWINGS

FIG. 2 is a perspective view on an expanded scale of a combined display/control panel for a counter shown in FIG. 1;

FIG. 3 is a plan view on an expanded scale of movement signaling means shown in FIG. 1.

DETAILED DESCRIPTION OF THE INVENTION

Figure 1:
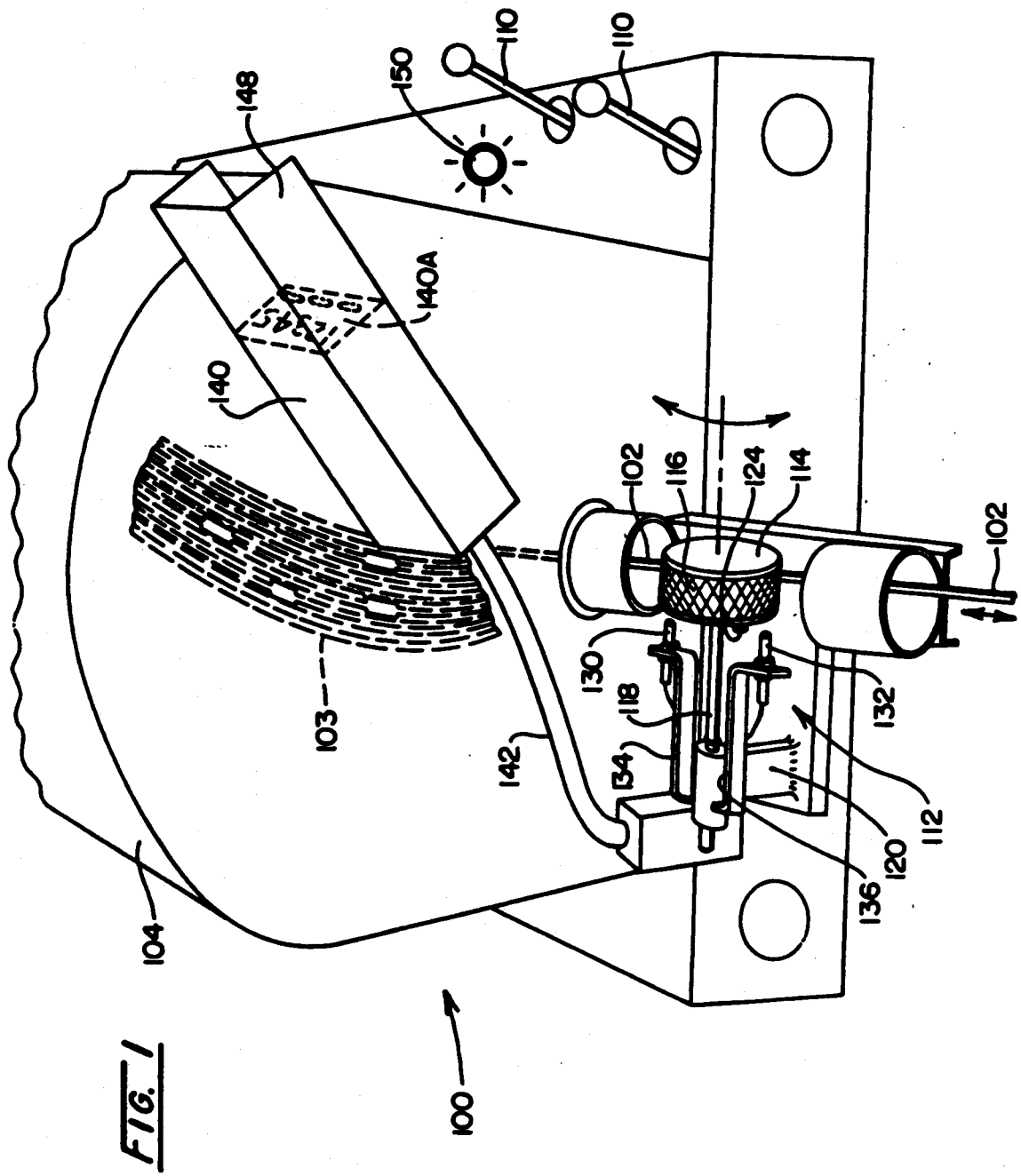
FIG. 1 is a perspective view of a sewer cleaning machine including the invention of the present application.

Reference will now be made to the drawing figures in which FIG. 1 is a perspective view of a sewer cleaning machine 100 including apparatus in accordance with the present invention for electronically monitoring the extended length of an elongated sewer cleaning tool 102 which is wound upon a reel 103 in a reel compartment 104 of the machine 100. The invention will be illustrated with reference to a sewer rodding machine wherein the tool 102 comprises a series of rods interconnected to define a required tool length; however, it is to be understood that the present invention is generally applicable to sewer cleaning machines including a variety of elongated sewer cleaning tools. In addition to interconnected rods, the tool 102 can comprise a spiral wound snake, a high pressure hose or any other elongated tool currently utilized or as may be developed in the future for sewer cleaning.

Figure 4:
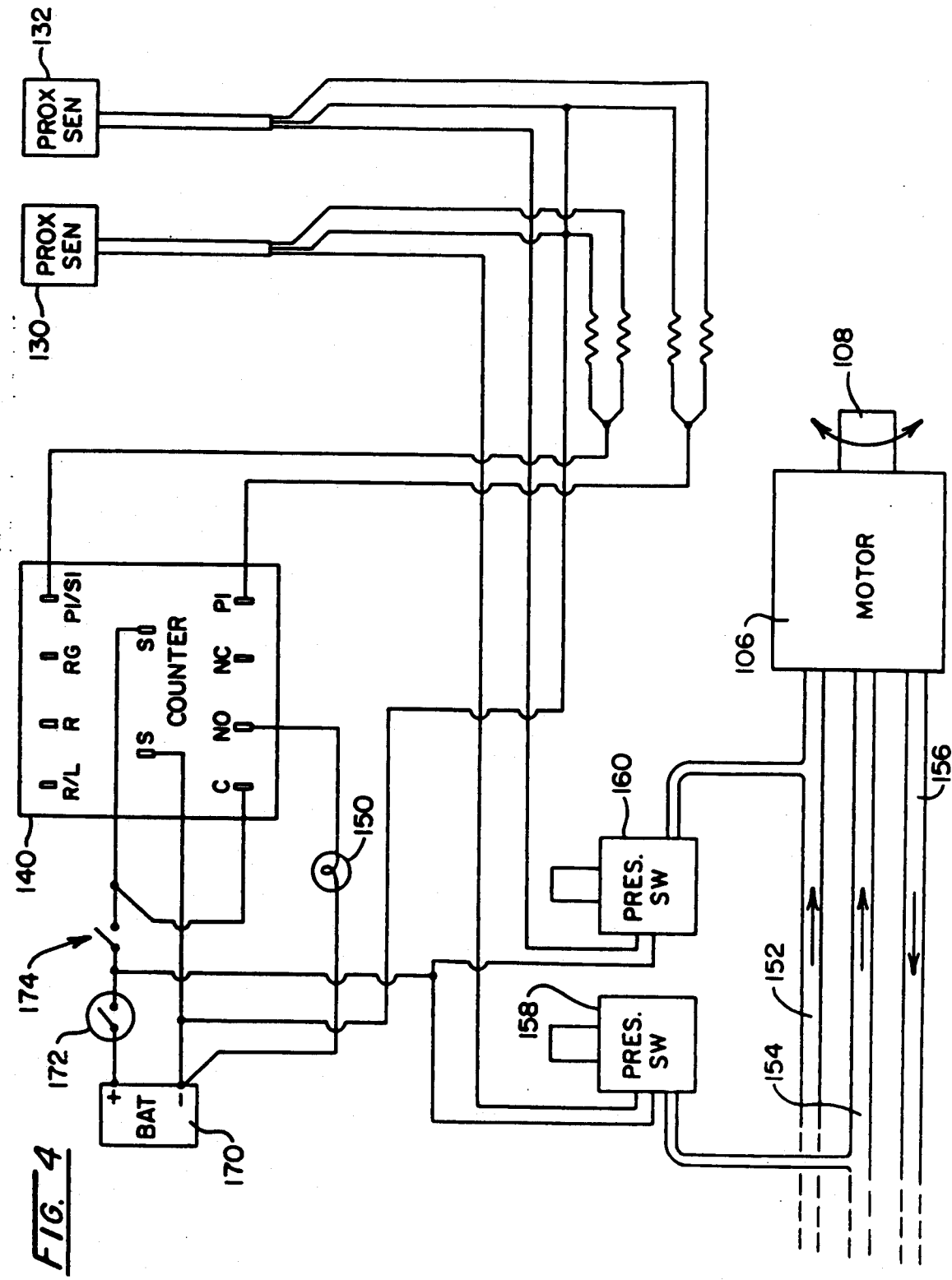
FIG. 4 is a schematic diagram of an illustrative embodiment of the invention of the present application.

Motor means comprising a hydraulic motor 106 which is shown only schematically in FIG. 4 is coupled to the tool reel 103 via a drive shaft 108. Motor control means comprising control levers 110 permit an operator to control the motor 106. The levers 110 are manipulated to rotate the motor 106 in one direction to play out the tool 102 into a sewer by unwinding it from the reel 103, and in the opposite direction to retract the tool 102 from the sewer by rewinding the tool 102 onto the reel 103. In accordance with the present invention, movement signaling means 112 best shown in FIGS. 1 and 3 are coupled to the tool 102 for generating signals representative of play out of the tool in defined incremental lengths.

In the illustrated embodiment, the movement signaling means comprises a rotatably mounted tool sensing drum 114 which includes a central portion 116 frictionally engaged with and rotated by the tool 102. The tool sensing drum 114 is mounted on a shaft 118 which is supported by a frame 120 and mounted for rotation by bearings 122 in the frame 120. The drum 114 includes a position indicator 124 mounted thereto and comprising an axially adjustable bolt 126 which is threadedly engaged into the side of the drum 114 and a locking nut 128 in the illustrated embodiment.

At least one proximity sensor means is positioned to sense the position indicator 124 as the drum 114 is rotated. As shown, the proximity sensor means comprises two proximity sensors 130, 132 which are mounted opposite to one another across a diameter of the tool sensing drum 114. The sensors 130, 132, which may be proximity sensors commercially available from Redington Counters Inc. of Windsor, Conn., are supported by brackets 134, 136 which are welded or otherwise secured to the frame 120 which supports the drum 114. The drum 114 is sized to define a preferred length of the tool 102, for example one foot of tool causes the drum 114 to make one revolution. For this sizing of the drum 114, a running count of the times the position indicator 124 is sensed substantially corresponds to the length in feet of the tool 102 which is extended from the machine 100.

Electronic counter means comprising a predetermining counter 140 commercially available from Redington Counters Inc. of Windsor, Conn. is connected to the movement signaling means 112 via a conduit 142. The counter 140 is responsive to the signals generated by the sensors 130, 132 for displaying a count representative of the length of the tool 102 which is currently extended from the reel 103. The counter 140 includes input means comprising touch switches 144 best shown in the perspective view of a combined display/control panel 140A for the counter 140. The touch switches 144 permit selection of a desired count by an operator of the machine 100.

When the entered count is attained, indicating that the entered length of the tool 102 is extended from the machine 100, it is signaled by output means comprising relay contacts Common (C), Normally Open (NO), and Normally Closed (NC) of the counter 140 as shown in FIG. 4. A count can be entered into the counter 140 by depressing touch switches 144A which correspond to and set the corresponding numerals on a display 146 directly above the switches 144A. The remaining touch switches 144B permit Entry (E), Display (D) and Resetting (R) of the counter 140 for operation of the present invention. To facilitate reading the numerals on the display 146 and accurate operation of the present invention, the counter 140 is oriented at an angle of approximately 30° relative to horizontal and a sunshield 148 is provided and extends upwardly and outwardly from the panel 140A. Alarm means comprising a visual alarm 150 is connected to the C and NO contacts of the counter for generating an alarm signal upon reaching the desired count and alerting the operator of the machine 100. Of course, an audible alarm can be provided instead of or in addition to the visual alarm 150.

Preferably, the present invention both upcounts and downcounts signals generated by the sensors 130, 132 such that a running indication of the length of the tool 102 extending from the machine 100 is available on the display 146 of the panel 140A. To that end, the movement signaling means 112 further comprises switch means coupled to the motor control levers 110 for activating the proximity sensor 130 upon rotation of the motor 106 in the direction to extend the tool 102 from the machine 100 and the proximity sensor 132 upon rotation of the motor 106 in the opposite direction to retract the tool 102 into the machine 100.

In the illustrated embodiment, the hydraulic motor 106 has forward, reverse and return hydraulic fluid lines 152, 154, 156, respectively, and the switch means comprise a first pressure switch 158 coupled to the forward hydraulic fluid line 152 and a second pressure switch 160 coupled to the reverse hydraulic fluid line 154. Appropriate pressure switches are commercially available from United Electric Controls Co. of Watertown, Mass. Thus, as shown in FIG. 4, the counter 140 is connected to upcount signals generated by the proximity sensor 130 and to downcount signals generated by the proximity sensor 132. The pressure switches 158, 160 provide selective connections of the proximity sensors 130, 132 in accordance with the operation of the machine 100 to thereby properly upcount or downcount the counter 140 as the tool 102 is extended and retracted, respectively. The remainder of the tool monitoring system shown in FIG. 4 includes the vehicle battery 170, the vehicle ignition switch 172 and a toggle switch 174 for activating the monitoring system.

The monitoring system in accordance with the present invention is operated as follows to facilitate efficient operation of a sewer cleaning machine including the system. Presuming that an operator wishes to clean a section of sewer extending from one manhole to the next adjacent manhole which is five hundred (500) feet away, the operator sets a length of tool which can be extended with little attention to the display 146 of the counter 140, for example four hundred ninety (490) feet or whatever length is comfortable for the operator. The counter 140 is then zeroed and the cleaning operation is commenced. The counter 140 is upcounted by signals from the sensor 130 which is connected by the switch 158 due to the pressure on fluid line 152 operating the motor 106 in a direction to play out the tool 102 from the reel 103.

The operator can observe the length of the tool 102 extending from the machine 100; however, the operator need not do so since a signal will be generated by the counter 140 via the alarm 150 when the tool 102 is extended the preset length, for example four hundred ninety (490) feet. When the alarm is activated, the operator can attentively monitor the display 146 of the counter 140 until the total cleaning length has been played out by the machine 100. The operator can then reset the counter 140 or not at the operator's option and depending on what mode of operation is most comfortable to the operator. If reset, the last remaining ten (10) feet of extension are directly read on the display of the counter 140; if not, the counter 140 continues to register the true value of the extended length of the tool 102.

Once the out cleaning job is complete, the operator retracts the tool 102 form the sewer and rewinds it onto the reel 103. Whether the tool 102 is used to perform a cleaning operation on its retraction or not, the operator can once again reset the counter 140, for example to ten (10) feet if the counter 140 was not reset or four hundred ninety (490) if it was reset such that an alarm is also given to alert the operator to the ultimate return of the tool 102 to the reel 103 of the machine 100.

It should be apparent that the above described apparatus permits operation of a sewer cleaning machine in accordance with the following method. The method for operating the mobile sewer cleaning machine 100 in accordance with the present invention wherein the machine includes an elongated sewer cleaning tool 102 which is wound upon a reel 103 mounted in a reel compartment 104 of the machine 100, the tool 102 being unwound by operation of a reel control motor 106 in one direction to play out the tool 102 into a sewer, and being rewound by operation of the reel control motor 106 in the direction opposite to the one direction to retract the tool 102 from the sewer comprises the steps of: sensing extension of the tool 102 from the machine 100; generating signals representative of length increments of the extension of the tool 102 from the machine 100; accumulating the signals to determine the length of the tool 102 extended from the machine 100; entering a defined length extension; and, activating an alarm 150 when the length of the tool 102 extended from the reel 103 is equal to the defined length extension, whereby an operator of the mobile sewer cleaning machine 100 is alerted to action upon attaining the defined length extension.

The method may further comprise the steps of: sensing retraction of the tool 102 into the machine 100; generating signals representative of length increments of the retraction of the tool 102 into the machine 100; and, algebraically accumulating the signals to determine the length of the tool 102 extended from the reel whereby the operator is alerted to action upon either the extension or the retraction of the tool 102. Preferably, the step of generating signals representative of the extension and retraction of the tool 102 comprises the steps of: sensing the extension of the tool 102 by means of a first proximity sensor 130; sensing the retraction of the tool by means of a second proximity sensor 132; and, monitoring the operation of the reel control motor 106 to enable the first or second proximity sensor 130 or 132 in response to the direction of operation of the reel control motor 106.

Having thus described the method and apparatus for monitoring sewer cleaning tool extension in accordance with the present invention in detail and by reference to preferred embodiments thereof, it will be apparent that modifications and variations are possible without departing from the scope of the invention defined in the appended claims.

What is claimed is:

1. A mobile sewer cleaning machine comprising:
   an elongated sewer cleaning tool wound upon a reel mounted in a reel compartment of the machine;
   motor means coupled to said reel for rotating said reel;
   motor control means for operating said motor means in one direction to play out said tool into a sewer by unwinding it from said reel, and in the direction opposite to said one direction to retract said tool from said sewer by rewinding said tool onto said reel;
   movement signaling means coupled to said tool for generating signals representative of play out of said tool in defined incremental lengths and retraction of said tool in defined incremental lengths, said movement signaling means comprising:
   a rotatably mounted tool sensing drum which is frictionally engaged with and rotated by said tool and including a position indicator mounted thereto,
   two proximity sensors positioned to sense said position indicator as said drum is rotated, and
   switch means coupled to said motor control means for activating one of said proximity sensors upon rotation of said motor means in said one direction and the other of said proximity sensors upon rotation of said motor means in said opposite direction;
   electronic counter means connected to said movement signaling means and responsive to said signals for displaying a count representative of the extent of said elongated sewer cleaning tool which has been unwound from said reel and/or rewound onto said reel, said electronic counter means including input means for selecting a desired count and output means for indicating when a desired count has been reached; and
   alarm means connected to the output means of said electronic counter means connected to the output means of said electronic counter means for generating an alarm signal upon reaching said desired count.

2. A mobile sewer cleaning machine as claimed in claim 1 wherein said two proximity sensors are mounted opposite to one another across a diameter of said tool sensing drum.

3. A mobile sewer cleaning machine as claimed in claim 2 wherein said motor means comprises a hydraulic motor having forward, reverse and return hydraulic fluid lines and said switch means comprise a first pressure switch coupled to said forward hydraulic fluid line and a second pressure switch coupled to said reverse hydraulic fluid line.

4. A mobile sewer cleaning machine as claimed in claim 3 wherein said alarm means comprises an audible alarm.

5. A mobile sewer cleaning machine as claimed in claim 3 wherein said alarm means comprises a visual alarm.

6. A mobile sewer cleaning machine as claimed in claim 3 wherein said alarm means comprises both audible and visual alarms.

* * * * *